Jan. 23, 1968             F. L. DAVIS            3,365,162
FLUSH SEATING, WATERTIGHT AND AIRTIGHT ANCHORAGES
FOR TIEDOWN GEAR AND OTHER EQUIPMENT
Filed April 22, 1965                           2 Sheets-Sheet 1
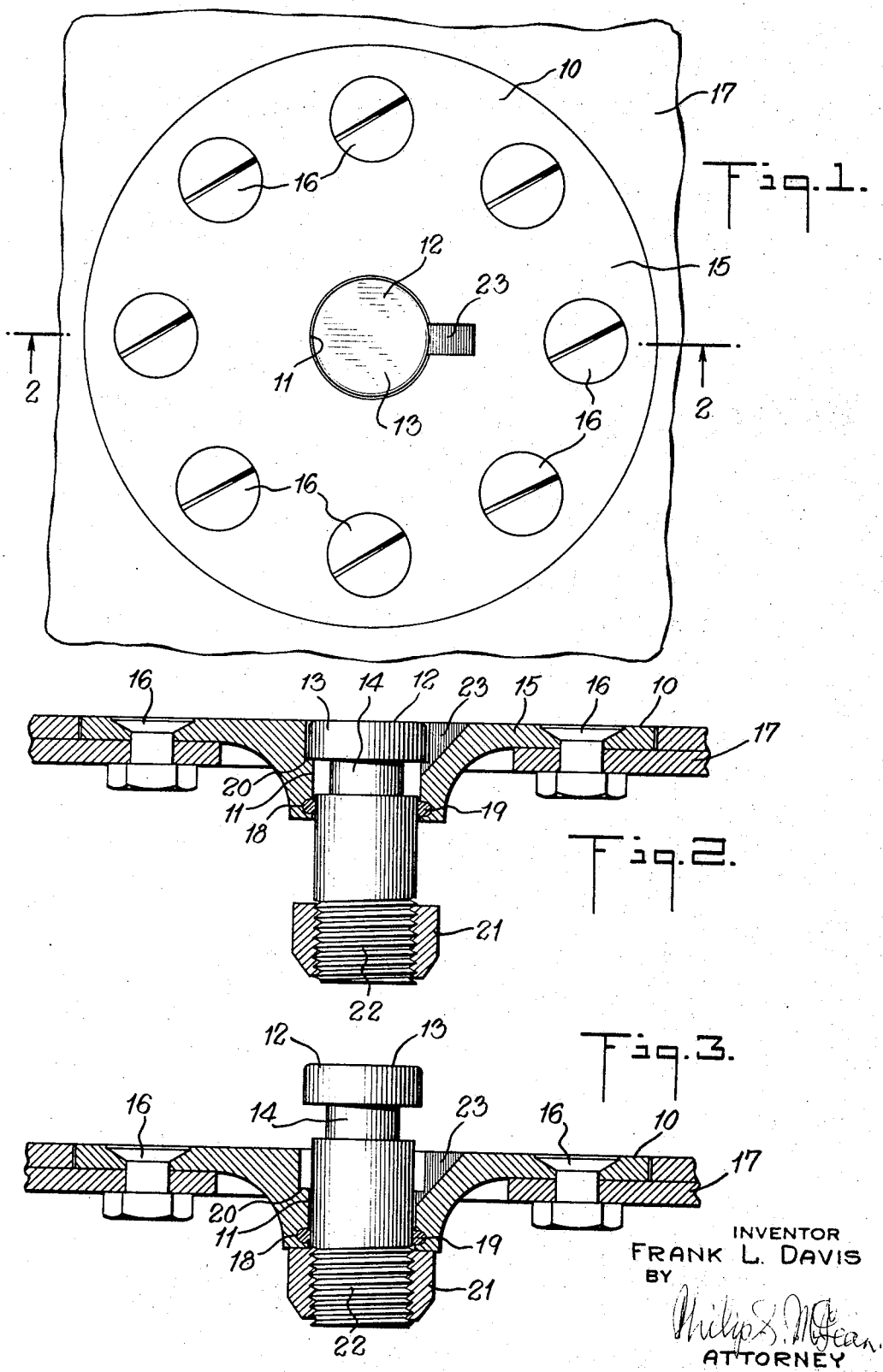
INVENTOR
FRANK L. DAVIS
BY
ATTORNEY Jan. 23, 1968  F. L. DAVIS  3,365,162
FLUSH SEATING, WATERTIGHT AND AIRTIGHT ANCHORAGES
FOR TIEDOWN GEAR AND OTHER EQUIPMENT
Filed April 22, 1965  2 Sheets-Sheet 2
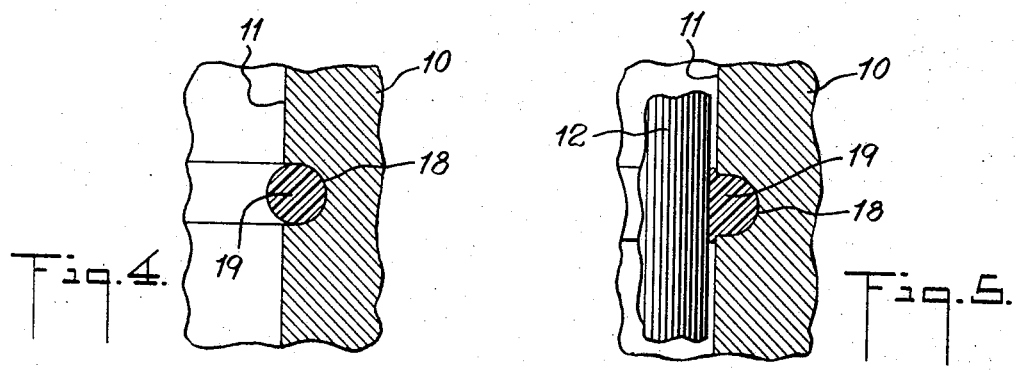
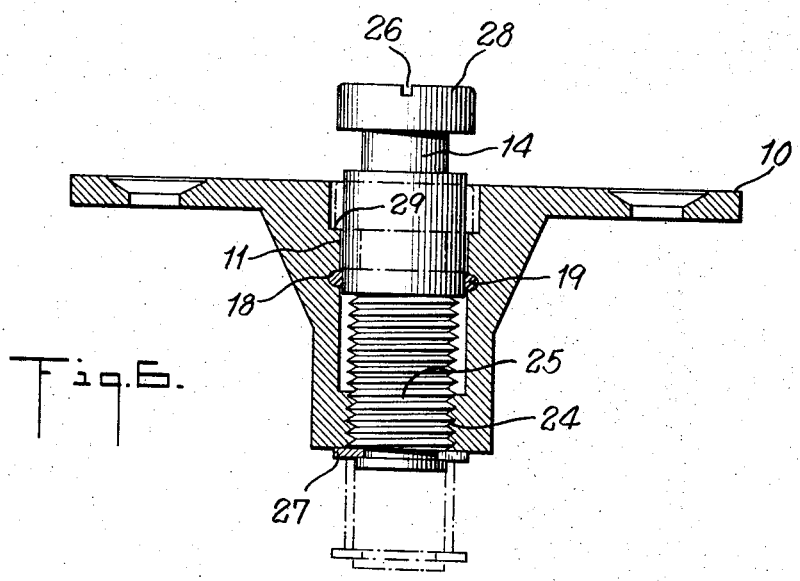
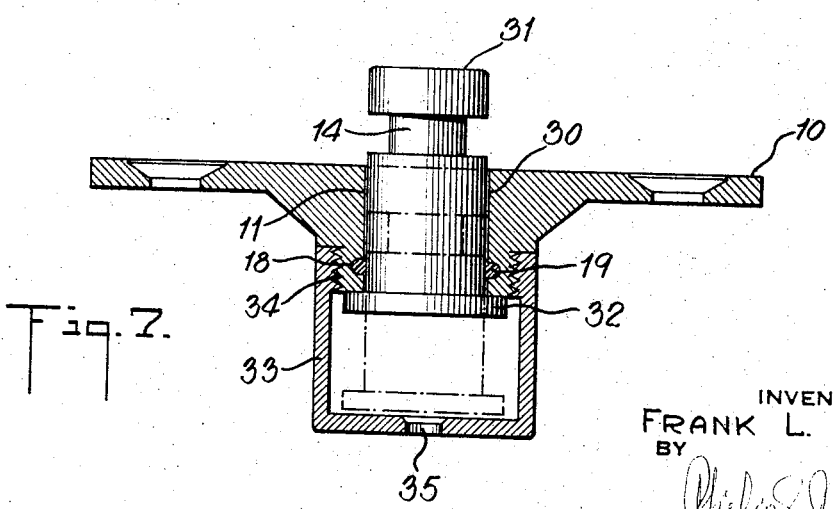
INVENTOR
FRANK L. DAVIS
BY
ATTORNEY United States Patent Office 3,365,162
Patented Jan. 23, 1968

3,365,162
FLUSH SEATING, WATERTIGHT AND AIR-
TIGHT ANCHORAGES FOR TIEDOWN
GEAR AND OTHER EQUIPMENT
Frank L. Davis, Box 760, Rte. 25A,
Fort Salonga, N.Y.
Filed Apr. 22, 1966, Ser. No. 544,424
1 Claim. (Cl. 248—361)

ABSTRACT OF THE DISCLOSURE

Anchorage for tiedown gear, seating flush in supporting structure when not in use, but readily withdrawn when needed and sealed air and watertight in both concealed and exposed positions and releasably held in all positions.

The invention herein disclosed relates to the construction of anchorages for tiedown, passenger seats and other equipment on aircraft and other conveyances, and the general objects of the invention are to provide a simple, sturdy, easily installed anchorage, which will seat flush in the floor, wall or other supporting surface and which will be watertight and airtight against pressurization and which will hold in retracted or other positions in which it may be set, but yield to intended change without loss of watertight or airtight seal.

The foregoing and other desirable objects are attained by a novel combination and relation of parts, including the use of O-rings seated stationary in the base portion of the device and held thereby in pressure flattened engagement with the holding stud which is supported for necessary limited movement in the base.

Other novel features and objects of the invention will appear and are set forth in the following specification.

The drawings accompanying and forming part of the specification illustrate present practical embodiments of the invention, but it will be appreciated that structure may be modified and changed as regards the immediate illustration, without departure from the true spirit and scope of the invention, as hereinafter defined and claimed.

FIG. 1 is a plan view of one of the anchorages as installed in a deck or flooring; the latter shown broken away.

FIG. 2 is a cross sectional view as on the plane of line 2—2 of FIG. 1, showing the holding stud fully seated in flush relation in the supporting base.

FIG. 3 is a similar view showing the stud lifted for use for anchorage purposes.

FIGS. 4 and 5 are broken section details; FIG. 4 illustrating the sealing and holding ring in place in the base, before insertion of the holding stud and FIG. 5 showing in exaggerated form how the projecting portion of the sealing ring flattens into holding and sealing engagement with the stud.

FIG. 6 is a sectional view of a modified form of the invention in which the stud is raised and lowered by screw action instead of by a straight lifting and lowering movement.

FIG. 7 is a sectional view illustrating another modification in which the body of the stud is of a single diameter and inserted up through the lower end of the supporting socket.

In all forms of the invention illustrated, there is a supporting base structure 10, adapted to be mounted on a deck, floor wall or other such structure and having an open ended cylindrical socket 11 adapted to receive and support a holding stud 12, arranged to sink to a flush position in the socket, as in FIG. 2, or to project, as shown in FIGS. 3, 6 and 7.

This disappearing stud has means at the upper exposed end of the same for engagement by an object or equipment to be secured, usually a head such as shown at 13 on the upper end of a reduced stem portion 14.

Other forms of holding and securing means on the upper end of the stud may be employed according to the different uses for which the fitting is designed, including a plain upper end portion which in projected position would hold an object against lateral movement over the base.

For ready mounting purposes, the base is usually provided with an extended annular flange 15 at the upper end for taking bolts or other fastenings 16, to engage the deck or supporting structure 17.

The cylindrical socket 11 is formed with an internal annular groove 18 in which there is firmly seated an elastomeric O-ring 19 of circular cross section.

The groove 18, as shown in FIGS. 4 and 5, is preferably slightly deeper than the radial cross section of the O-ring, so that this ring is fully seated in the wall of the socket with a considerable arcuate inner portion of the same projecting into the bore of the socket, as indicated in FIG. 4.

When the stud is entered in the socket, as in FIG. 5, the projecting portion of the O-ring is more or less flattened against the cylindrical wall of the stud; thus to form an extended flattened surface in sealing and holding engagement with the stud.

In the first illustrated embodiment of the invention, the recessional movement of the stud is limited by engagement of the enlarged head 13, on the upper end of the stud, with an annular supporting shoulder 20, in the upper end portion of the cylindrical structure and the raised or extended movement of the stud is limited by a nut 21 on the lower screw threaded end portion 22 of the stud engaging the lower end of the socket, FIG. 3.

To enable easy lifting of the stud the base is shown provided with an inclined notch 23 extending, at one side of the socket, down below the head of the stud, FIG. 2, for reception of a screw-driver or other suitable implement for lifting the stud.

The use of a nut to serve as a stop for limiting the lifting movement of the stud has the advantage that it may be adjusted on the stud to vary the extent of such lifting movement, or to take up slack.

As shown in FIGS. 2 and 3, the O-ring is located to engage the cylindrical wall of the stud in all positions of the stud, thus to provide an airtight and watertight seal and to frictionally hold the stud in any position to which it may be set.

The form of the invention shown in FIG. 6 differs from the preceding, particularly in that the lifting and lowering movement of the stud is effected by extending the cylinder of the base downward and forming it with a screw socket 24, and by extending and screw threading the lower end of the stud, as at 25, so that on rotating the stud, as by a screw driver inserted in the slot 26, in the head of the stud, it may be raised or lowered to an extent within the limits of the screw threaded portion.

A snap ring 27 is shown engaged on the lower projecting end of the stud for engagement with the lower end of the cylinder to limit the extreme upward, exposure movement of the stud and the lowering movement is limited to the flush position by engagement of the head 28 on the upper end of the stud with the annular shoulder 29 in the upper end of the socket.

FIG. 7 illustrates a simplified form of the invention in which the socket 30 and the holding pin 31 are all of one diameter, so that the stud or pin may be inserted up through the lower end of the socket, with upward movement limited by engagement of an outstanding flange or shoulder 32, on the lower end of the stud with the lower end of the socket.

The downward retractive movement of the stud in this case is limited by an enclosure 33, in the nature of a screw cap, engaged at 34, over the lower screw threaded end of the socket.

This stop cap is shown as having a weep hole 35 in the bottom to avoid buildup of pressure which would interfere with retractive movement of the stud and to release any condensation, and this opening also may be utilized for insertion of a tool to push the stud up into exposed holding position.

If desired, the upper ends of the holding studs may be provided with undercut recesses or other means for engagement by some form of a grappling tool for lifting the studs.

The air and watertight features of the invention are particularly important, enabling this anchorage to be used where pressurization is employed and the holding effect is highly desirable in many cases where it is necessary that the holding stud be lifted and stand in that lifted position while holddown gear or objects are being shifted or being made ready for engagement with the anchorage. In such circumstances, the holding stud will not drop back out of reach while such gear is being made ready.

What is claimed is:

1. A watertight and airtight flush anchorage, comprising a base having means for mounting the same on supporting structure and provided with a socket in the form of an open ended cylinder, a cylindrical holding stud slidable from an unexposed flush seated position in said cylinder to an exposed projecting position and having securing means at the end which is exposed for engagement by a member which is to be secured by said anchorage, companion stop means on said cylinder and stud engaging to support the stud in retracted flush seated position in the cylinder and to limit projection of the stud to a position with said securing means exposed for engagement by a member to be secured, said cylinder having a generally circular groove of deeper than semi-circular cross section in the internal wall thereof at a point opposed to the cylindrical wall of the stud in all positions of the stud, and an elastomeric O-ring of originally substantially circular cross section seated in said groove and projecting therefrom into compressed flattened engagement with said cylindrical stud and thereby sealing said stud and frictionally holding the same in all positions of the stud in the socket, said cylinder and stud being each of the same diameter and said companion stop means including a flange on the lower end of the stud engageable with the lower end of the cylinder to limit upward movement of the stud and a cap enclosing the lower end of the stud and screw threaded over the lower end of the cylinder for limiting downward retractive movement of the stud.

References Cited

UNITED STATES PATENTS

| | | | |
|---|---|---|---|
| 2,153,679 | 4/1939 | Rich | 248—361 |
| 2,915,152 | 12/1959 | Graham | 287—189.36 |
| 3,223,375 | 12/1965 | Bernasconi | 248—361 |
| 3,275,284 | 9/1966 | Gary | 248—361 |
| 3,295,874 | 1/1967 | Allen | 151—69 X |

ROY D. FRAZIER, *Primary Examiner.*

R. P. SEITTER, *Assistant Examiner.*